(12) United States Patent
Waddell et al.

(10) Patent No.: US 7,385,008 B2
(45) Date of Patent: Jun. 10, 2008

(54) ABRASION RESISTANT ELASTOMERIC COMPOSITIONS

(75) Inventors: Walter Harvey Waddell, Pasadena, TX (US); Robert Ryan Poulter, League City, TX (US)

(73) Assignee: ExxonMobile Chemical Patents Inc., Houston, TX (US)

(*) Notice: Subject to any disclaimer, the term of this patent is extended or adjusted under 35 U.S.C. 154(b) by 0 days.

(21) Appl. No.: 11/871,304

(22) Filed: Oct. 12, 2007

(65) Prior Publication Data
US 2008/0033101 A1   Feb. 7, 2008

Related U.S. Application Data

(62) Division of application No. 10/503,368, filed as application No. PCT/US03/05484 on Feb. 21, 2003, now Pat. No. 7,300,981.

(60) Provisional application No. 60/364,377, filed on Mar. 13, 2002.

(51) Int. Cl.
*C08F 8/38* (2006.01)

(52) U.S. Cl. ............ 525/194; 525/195; 525/209; 525/329.3; 525/331.1; 525/332.7; 525/352

(58) Field of Classification Search ............ 525/194, 525/195, 209, 329.3, 331.1, 332.7, 352
See application file for complete search history.

(56) References Cited

U.S. PATENT DOCUMENTS

| | | | |
|---|---|---|---|
| 4,952,641 A | 8/1990 | Wolff et al. |
| 4,983,685 A | 1/1991 | Aoshima et al. |
| 5,093,418 A | 3/1992 | Kinoshita et al. |
| 5,162,409 A | 11/1992 | Mroczkowski |
| 5,332,787 A | 7/1994 | Gardner |
| 5,446,097 A | 8/1995 | Nonaka et al. |
| 5,466,757 A | 11/1995 | Watanabe et al. |
| 5,504,164 A | 4/1996 | O'Donnell |
| 5,594,073 A | 1/1997 | Crepeau et al. |
| 5,684,077 A | 11/1997 | Tracey et al. |
| 5,705,549 A | 1/1998 | Hojo |
| 5,744,566 A | 4/1998 | Tsutsui et al. |
| 6,013,218 A | 1/2000 | Patitsas et al. |
| 6,060,552 A | 5/2000 | Kaido |
| H1922 H | 11/2000 | Fusco et al. |
| 6,201,054 B1 | 3/2001 | Hara et al. |
| 6,242,523 B1 | 6/2001 | Blok et al. |
| 6,329,450 B1 | 12/2001 | Ogoe et al. |
| 6,333,375 B1 | 12/2001 | Nakamura et al. |
| 6,334,919 B1 | 1/2002 | Takeyama et al. |

FOREIGN PATENT DOCUMENTS

| | | |
|---|---|---|
| EP | 0 857 761 | 8/1998 |
| WO | WO 92/01575 | 2/1992 |

OTHER PUBLICATIONS

Hoover et al., "Black Tire Sidewall Compounds Based on Brominated Poly(isobutylene-co-p-methylstyrene), Elastomer and Accelerated with 1,6-Hexamethylene-bis(sodium thiosulfate)" Meeting of the Rubber Division, Oct. 17, 1995. 38 pages (Reference XP002047677).

*Primary Examiner*—Bernard Lipman
(74) *Attorney, Agent, or Firm*—Kevin M. Faulkner; Nancy T. Krawczyk

(57) ABSTRACT

The present invention includes elastomeric compositions of BIMS elastomers suitable for abrasion resistant, high traction and/or air barrier articles. The compositions and articles made from those compositions of the invention can be described in any number of embodiments. In one embodiment, the composition suitable for an abrasion resistant article includes from 5 to 100 phr of a terpolymer of $C_4$ to $C_7$ isoolefin derived units, p-alkylstyrene derived units and p-bromomethylstyrene derived units; at least one filler such as carbon black, silica, precipitated silica, clay, or combinations thereof, and from 0.1 to 3 phr of at least one thiourea. The composition can also include from 5 to 80 phr of at least one elastomer selected from natural rubbers, polyisoprene rubber, styrene butadiene rubber (SBR), polybutadiene rubber, isoprene butadiene rubber (IBR), styrene-isoprene-butadiene rubber (SIBR), butyl rubber, halogenated butyl rubber, butadiene-acrylonitrile-styrene rubber (SNBR), and mixtures thereof. The composition can be cured by using one or a combination of curatives known in the rubber industry. For example, the composition may include from 0.1 to 10 phr of at least one of a peroxide, sulfur, a metal oxide, or a combination thereof. In a further embodiment, the thiourea is present from 0.2 to 1.5 phr in the composition.

23 Claims, 3 Drawing Sheets

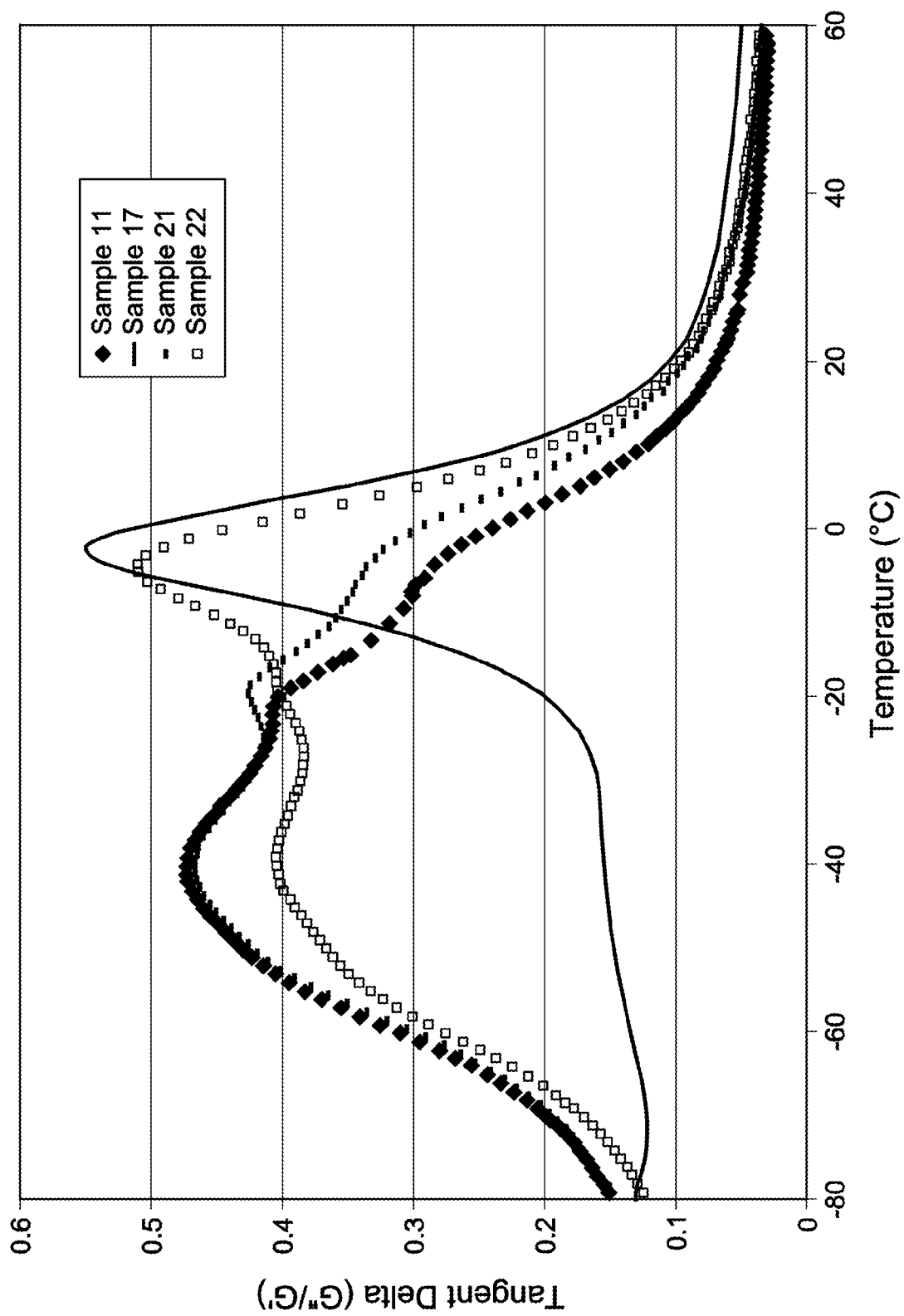

ABRASION RESISTANT ELASTOMERIC COMPOSITIONS

CROSS REFERENCE TO RELATED APPLICATIONS

This application is a Divisional Application of U.S. Ser. No. 10/503,368, filed Aug. 3, 2004, now U.S. Pat. No. 7,300,981, which is the National Stage Application of International Application No. PCT/US03/05484, filed Feb. 21, 2003, which claims the benefit of Provisional Application No. 60/364,377, filed Mar. 13, 2002.

FIELD OF INVENTION

The present invention relates to abrasion resistant and high traction elastomeric compositions, and more particularly to compositions of brominated poly(isobutylene-co-p-methylstyrene) (BIMS) elastomers including a thiourea cure agent.

BACKGROUND OF THE INVENTION

Elastomeric compositions are useful for a variety of abrasion resistant articles such as tire components and shoe components. There is a need to improve the balance between grip properties under a variety of service conditions (traction on dry, wet and winter surfaces) and durability (wear life) of the rubber article. No one elastomer is capable of delivering the desirable balance of properties to date. For example, it is known that cis-polybutadiene (BR) exhibits excellent abrasion resistance (high DIN Abrasion values), but has poor grip. Likewise, polymers such as butadiene-acrylonitrile-styrene rubber (SNBR) exhibit desirable wet traction properties (based on Tangent Delta (G"/G') values at 0° C.), but low abrasion resistance and low winter traction (based on Tangent Delta (G"/G') values at −30° C.). Further, brominated poly(isobutylene-co-p-methylstyrene) (BIMS) polymers are known to exhibit good traction (based on the Tangent Delta values), but poor abrasion resistance.

A combination of elastomers can be used to achieve a balance of properties for abrasion resistant articles. However, this combination must be achieved while maintaining other desirable properties, such as maintaining grip and abrasion resistance when combined with fillers such as silica, which tend to decrease abrasion resistance. One method of achieving an optimal balance of properties is to optimize the curatives used to cure the elastomeric composition. While the use of metal oxide and sulfur is common, the compositions can be further optimized by the appropriate choice of other curatives. Thiourea curatives are one example of a general class of curatives that have been disclosed as a possible additive to certain curable compositions, such as, for example, in U.S. Pat. Nos. 5,684,007; 6,013,218, 6,334,919, and H1,922. However, it is unclear what type of "thiourea" may be useful, and the amount that is optimal. Further, the utility of thioureas in compositions including BIMS as the only elastomer, or in combination with other elastomers, has not been described.

Thus, there is a need to find the optimal balance of curative with a balance of various elastomers in order to achieve a desired cured composition having both desirable traction properties with desirable abrasion resistance properties. The present invention is directed towards such a need.

Other background references include WO 92/01575, EP 0 857 761, and U.S. Pat. No. 5,594,073.

SUMMARY OF THE INVENTION

The present invention includes elastomeric compositions of BIMS elastomers suitable for abrasion resistant, high traction and/or air barrier articles. The compositions, and articles made from those compositions, of the invention can be described in any number of embodiments. For example, the invention can be described as a composition suitable for an abrasion resistant article comprising from 5 to 100 phr of a terpolymer of $C_4$ to $C_7$ isoolefin derived units, p-alkylstyrene derived units and p-bromomethylstyrene derived units; at least one filler such as carbon black, silica, precipitated silica, clay, or combinations thereof, and from 0.1 to 3 phr of at least one thiourea. The composition can also include from 5 to 80 phr of at least one elastomer selected from natural rubbers, polyisoprene rubber (IR), styrene butadiene rubber (SBR), polybutadiene rubber, isoprene butadiene rubber (IBR), styrene-isoprene-butadiene rubber (SIBR), butyl rubber (IIR), halogenated butyl rubber (HIIR), butadiene-acrylonitrile-styrene rubber (SNBR), and mixtures thereof. The composition can be cured by using one or a combination of other curatives known in the rubber industry. For example, the composition may include from 0.1 to 10 phr of at least one of a peroxide, sulfur, a metal oxide, or a combination thereof. In a further embodiment, the thiourea is present from 0.2 to 1.5 phr in the composition.

The "thiourea" present in the composition improves the overall performance of the cured composition, making it ideally suited for abrasion resistant articles, and even air barriers such as bladders, innertubes and innerliners, in compositions including at least one BIMS elastomer. The at least one thiourea may be selected from the group of structures represented by:

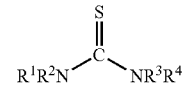

wherein $R^1$, $R^2$, $R^3$, and $R^4$ can be the same or different, and are radicals selected from hydrogen, methyl, ethyl, linear $C_3$ to $C_{20}$ alkyl, branched $C_3$ to $C_{20}$ alkyl, vinyl, linear $C_3$ to $C_{20}$ alkenyl, branched $C_3$ to $C_{20}$ alkenyl, substituted linear $C_3$ to $C_{20}$ alkyl, and substituted branched $C_3$ to $C_{20}$ alkyl.

Described another way, the at least one thiourea is selected from $H_4$-thiourea, methylthiourea, ethylthiourea, propylthiourea, isopropythiourea, butylthiourea, isobutylthiourea, tert-butylthiourea, 1,3-dimethylthiourea, 1,3-diethylthiourea, 1,3-dipropylthiourea, 1,3-dibutylthiourea, 1,3-di-tert-butylthiourea, 1,3-diisobutylthiourea, 1,3-diisopropylthiourea, 1,3-dipentylthiourea, 1,3-diisopentylthiourea, 1,3-diphenylthiourea, 1,1,3-trimethylthiourea, ethylene thiourea (2-mercaptoimidazole), and blends thereof. In yet another embodiment of the composition, the thiourea is selected from butylthiourea, isobutylthiourea, tert-butylthiourea, 1,3-dibutylthiourea, 1,3-di-tert-butylthiourea, 1,3-diisobutylthiourea, and mixtures thereof.

BRIEF DESCRIPTION OF THE DRAWINGS

FIG. 3 is a representation of dynamic properties of samples 11, 17, 21 and 22 plotted as Tangent Delta (G"/G') as a function of temperature.

DETAILED DESCRIPTION OF THE INVENTION

Figure 1:
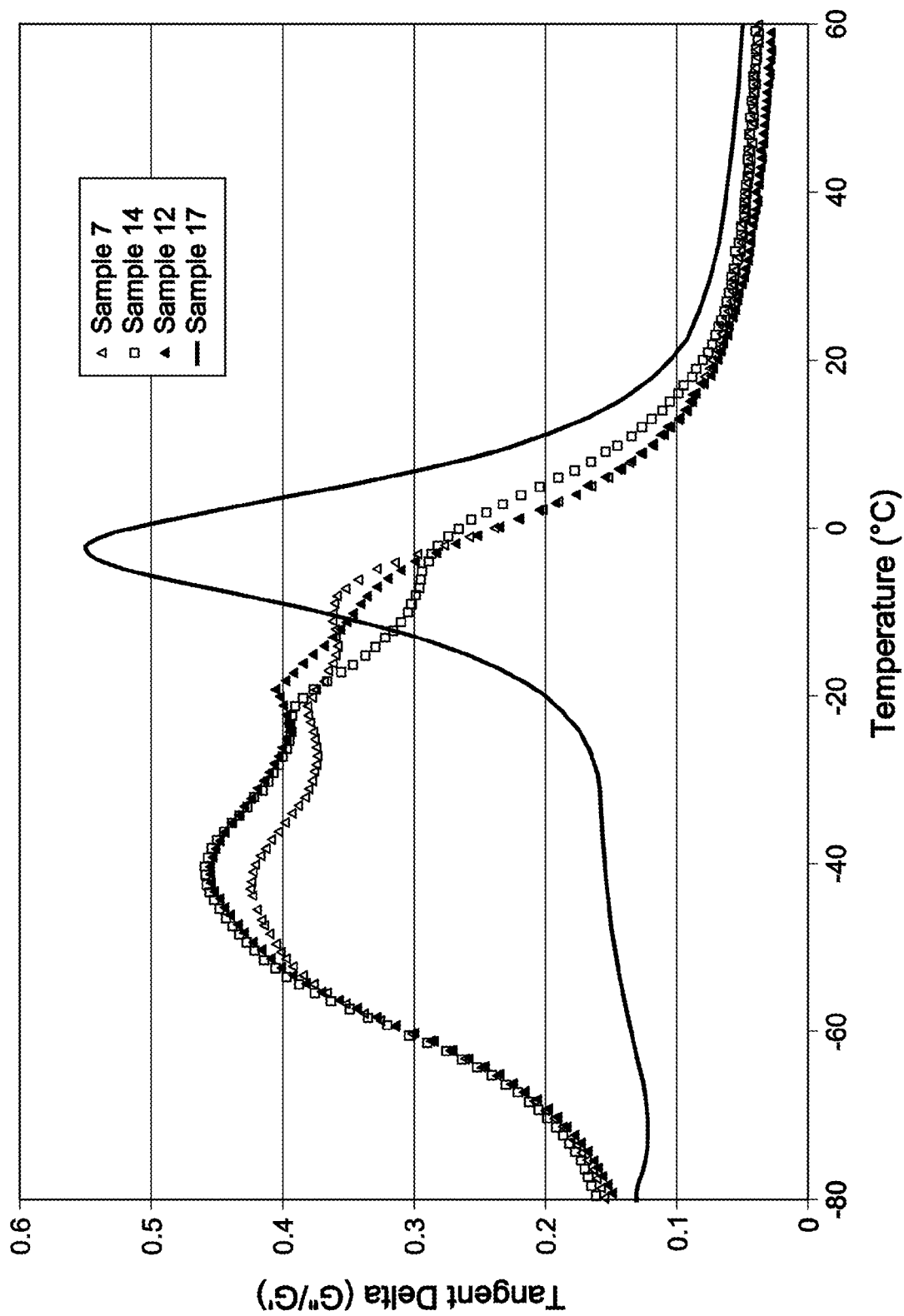
FIG. 1 is a representation of dynamic properties of samples 7, 14, 12 and 17 plotted as Tangent Delta (G"/G') as a function of temperature.

Embodiments of the present invention encompass an elastomeric composition containing at least one primary elastomeric component, for example, a terpolymer of an isoolefin, a p-methylstyrene, and brominated p-methylstyrene (BIMS). In another embodiment, the compositions of the invention, and articles made therefrom, include at least one secondary elastomeric component selected from natural rubber (NR), polybutadiene rubber (BR) and/or butadiene-acrylonitrile-styrene rubber (SNBR), and other elastomers disclosed herein. In yet another embodiment, the elastomeric composition also includes a filler such as silica and/or carbon black. Further, desirable properties are achieved by adjusting the cure and accelerator additives as part of a cure system, in particular, by the addition of a thiourea, to the cure system. The ultimate purpose of the composition is to form tire treads, tire sidewalls, shoe soles, belts and other components where a high degree of traction and abrasion resistance is desired. Hereinafter in the descriptions, the term "phr" refers to parts per hundreds rubber, as is commonly used in the art. The composition of the elastomers may be combined in ratios that are equivalent to 100 phr in one embodiment.

The elastomeric composition of the present invention contains at least one primary elastomeric component. The primary elastomeric component can be copolymers of a $C_4$ to $C_7$ isoolefin and a p-alkylstyrene, styrenic compounds, polyurethanes, or blends thereof. Preferably, the elastomeric component of the present invention is an isoolefin/p-alkylstyrene copolymer, wherein the isoolefin is isobutylene. In addition, the p-alkylstyrene is preferably p-methylstyrene. In another embodiment, the elastomeric component is a terpolymer of isobutylene, p-methylstyrene and p-bromomethylstyrene, or brominated poly(isobutylene-co-p-methylstyrene) (BIMS), as disclosed in U.S. Pat. No. 5,162,445.

This copolymer or BIMS terpolymer comprises at least 5 phr of the elastomeric composition in one embodiment, and up to 100 phr in another embodiment. Desirably, the BIMS is present from 5 to 80 phr of the elastomeric composition in one embodiment, from 10 to 60 phr in another embodiment, from 10 to 50 phr in yet another embodiment, from 15 to 40 phr in yet another embodiment, from 10 to 30 phr in yet another embodiment, and from 40 to 80 phr in yet another embodiment, wherein a desirable range of BIMS in the composition may be any combination of any upper phr limit with any lower phr limit. Desirable commercial examples of such terpolymers are EXXPRO™ Elastomers (ExxonMobil Chemical Company, Houston Tex.), and have a range of Mooney Viscosities from 30 to 65 MU (1+8, 125° C.) in one embodiment, and from 32 to 50 MU in another embodiment.

The relative amounts of p-alkylstyrene and p-haloalkylstyrene in the copolymer and/or terpolymer can vary widely. Different applications may require different formulations. Generally, the copolymer or terpolymer of the present invention will have from 2 wt % to 20 wt % p-alkylstyrene in one embodiment, and from 3 wt % to 15 wt % in another embodiment, and from 5 wt % to 10 wt % in yet another embodiment relative to the total weight of the copolymer or terpolymer. The p-alkylstyrene is preferably p-methylstyrene. In addition, the terpolymer of the present invention will have from 0.20 mol % to 3.0 mol % of a halogenated monomer units, such as p-bromomethylstyrene, in one embodiment, and from 0.3 mol % to 2.5 mol % in yet another embodiment, and up to 5.0 mol % in yet another embodiment, and at least 0.05 mol % in yet another embodiment relative to the total number of moles of monomer units.

In certain formulations, low levels of either p-bromoalkylstyrene and/or p-alkylstyrene may be used. In one embodiment, p-alkylstyrene (preferably p-methylstyrene) is from 5 wt % to 15 wt % of the copolymer or terpolymer, relative to the total weight of the copolymer or terpolymer. In another embodiment, the p-methylstyrene is from 5 wt % to 10 wt % of the copolymer or terpolymer. In another embodiment, the halogenated compound, such as p-bromomethylstyrene is from 0.5 mol % to 2.0 mol % of the terpolymer. In yet another embodiment, it is from 0.5 mol % to 1.5 mol % of the terpolymer.

Compositions suitable for abrasion resistant shoe soles, belts, tire treads and/or sidewalls include at least one secondary elastomeric component in conjunction with the BIMS elastomeric component described above. The secondary elastomeric component of the elastomer composition is present in the elastomeric composition in a range from 50 to 95 phr in one embodiment, from 50 to 80 phr in another embodiment, and from 50 to 70 in yet another embodiment, from 10 to 50 phr in yet another embodiment, and from 20 to 40 in yet another embodiment, wherein the desirable phr range of the secondary elastomer in the composition is any combination of any upper phr limit with any lower phr limit. The secondary elastomeric component of the present blend compositions are selected from natural rubbers (NR), polyisoprene rubber (IR), styrene-butadiene rubber (SBR), polybutadiene rubber (BR), isoprene-butadiene rubber (IBR), styrene-isoprene-butadiene rubber (SIBR), butyl rubber, halogenated butyl rubber, butadiene-acrylonitrile-styrene rubber (SNBR), and mixtures thereof.

So called "butyl rubber" and "halogenated butyl rubber" are typically copolymers of isobutylene derived monomer units and multiolefin derived monomer units such as isoprene. The butyl rubber can be halogenated to form chloro- or bromobutyl rubber. These rubbers are common in the art and described in, for example, RUBBER TECHNOLOGY 284-321 (Maurice Morton ed., Chapman & Hall 1995) (1987). In an alternate embodiment of the invention, butyl and halogenated butyl rubbers are absent from the composition used to make, for example, automotive tire treads and sidewalls. By "absent", it is meant that those rubbers are not added to the composition during any portion of the process of blending the components, and/or forming the end article such as an automotive tire component. Thus, in this embodiment, the secondary elastomeric component is selected from natural rubbers, polyisoprene rubber, styrene-butadiene rubber (SBR), polybutadiene rubber (BR), isoprene-butadiene rubber (IBR), styrene-isoprene-butadiene rubber (SIBR), butadiene-acrylonitrile-styrene rubber (SNBR), and mixtures thereof.

An embodiment of the secondary elastomeric component is natural rubber. Natural rubbers are described in detail by *Subramaniam* in RUBBER TECHNOLOGY, 179-208. Desirable embodiments of the natural rubbers of the present invention are selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Some commercial examples of the secondary elastomeric components useful in the present invention are NATSYN™ (Goodyear Chemical Company), a polyisoprene (IR), and BUDENE™ 1207 or BR 1207 (Goodyear Chemical Company), a polybutadiene (BR). A desirable secondary rubber component is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the covulcanized composition is BUDENE™ 1207.

In another embodiment, the secondary elastomer is a butadiene-acrylonitrile-styrene rubber (SNBR, or "ABS" rubber), a copolymer of 2-propenenitrile, 1,3-butadiene and styrene, and can have an acrylonitrile content of from 10 to 40 wt % in one embodiment, from 15 to 30 wt % in another embodiment, and from 18 to 30 wt % in yet another embodiment. The styrene content of the SNBR copolymer may range from 15 wt % to 40 wt % in one embodiment, and from 18 wt % to 30 wt % in another embodiment, and from 20 to 25 wt % in yet another embodiment. The Mooney Viscosity may range from 30 to 60 MU in one embodiment (1+4, 100° C.), and from 30 to 55 MU in another embodiment. These rubbers are common in the art, and described in, for example, HANDBOOK OF PLASTICS, ELASTOMERS, AND COMPOSITES 1.41-1.49 (Charles A. Harper, ed., McGraw-Hill, Inc. 1992).

The elastomeric composition may have one or more filler components such as calcium carbonate, clay, silica, talc, titanium dioxide, and carbon black. In one embodiment, the filler is carbon black or modified carbon black, and combinations of any of these. In another embodiment, the filler is a blend of carbon black and silica. The preferred filler for such articles as tire treads and sidewalls is reinforcing grade carbon black present at a level of from 10 to 100 phr of the blend, more preferably from 30 to 80 phr in another embodiment, and from 50 to 80 phr in yet another embodiment. Useful grades of carbon black, as described in RUBBER TECHNOLOGY, 59-85, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762.

The fillers of the present invention may be any size and typically range, for example, from about 0.0001 μm to about 100 μm. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

Compositions of the present invention suitable for shoe soles and colorable sidewalls typically include at least one filler with a non-staining mineral filler such as, but not limited to, fumed or precipitated silicas, clays, talcs, calcium carbonates, aluminum oxides, titanium oxides, and zinc oxides. The silica may be present in the composition from 10 to 100 phr. The silica used in the colorable elastomeric compositions of the present invention is preferably a mixture of fumed and precipitated silicas. If desired in a non-colorable composition, a silica or silica/carbon black blend may be present in the composition from 10 to 80 phr of the elastomeric composition in one embodiment, and from 30 to 50 phr in another embodiment. Other suitable non-black fillers and processing agents (e.g., coupling or "crosslinking" agents) for these fillers are disclosed in the BLUE BOOK 275-302, 405-410 (Lippincott & Peto Publications, Rubber-World 2001). The crosslinking agent used in the colorable elastomeric compositions of the present invention is preferably an organosilane-crosslinking agent. Preferably, the organosilane-crosslinking agent composes from 1 to 15 weight percent, based on the weight of silica, of the colorable elastomeric composition. More preferably, it composes from 1.5 to 10 weight percent of the composition.

One or more crosslinking agents are preferably used in the elastomeric compositions of the present invention, especially when silica is the primary filler, or is present in combination with another filler. More preferably, the coupling agent may be a bifunctional organosilane crosslinking agent. By an "organosilane crosslinking agent" is meant any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltri-methoxysilane, gamma-amino-propyl triethoxysilane (sold commercially as A100 by Witco), gamma-mercaptopropyl-trimethoxysilane (A189 by Witco) and the like, and mixtures thereof. In one embodiment, bis-(3-triethoxysilylpropyl)tetrasulfide (sold commercially as "Si69") is employed.

A processing aid may also be present in the composition of the invention. Processing aids include, but are not limited to, plasticizers, tackifiers, extenders, chemical conditioners, homogenizing agents and peptizers such as mercaptans, petroleum and vulcanized vegetable oils, mineral oils, paraffinic oils, naphthenic oils, aromatic oils, waxes, resins, rosins, and the like. The aid is typically present from 1 to 70 phr in one embodiment, from 3 to 60 phr in another embodiment, and from 5 to 50 phr in yet another embodiment. Some commercial examples of processing aids are SUNDEX™ (Sun Chemicals), a naphthenic processing oil, PARAPOL™ (ExxonMobil Chemical Company), a polybutene processing oil having a number average molecular weight of from 800 to 3000, and FLEXON™ (ExxonMobil Chemical Company), a paraffinic petroleum oil.

The compositions produced in accordance with the present invention typically contain other components and additives customarily used in rubber mixes, such as effective amounts of other nondiscolored and nondiscoloring processing aids, pigments, accelerators, crosslinking and curing materials, antioxidants, antiozonants. General classes of accelerators include amines, guanidines, thioureas, thiazoles, thiurams, sulfenamides, sulfenimides, thiocarbamates, xanthates, and the like. Crosslinking and curing agents include sulfur, zinc oxide, and fatty acids. Peroxide cure systems may also be used. The components, and other curatives, are typically present from 0.1 to 10 phr in the composition.

Generally, polymer blends, for example, those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, 18-23 (1991). Generally, polymer blends may be crosslinked by adding curative molecules, for example sulfur, metal oxides, organometallic compounds, radical initiators, etc., followed by heating. In particular, the following metal oxides are common curatives that will function in the present invention: $ZnO$, $CaO$, $MgO$, $Al_2O_3$, $CrO_3$, $FeO$, $Fe_2O_3$, and NiO. These metal oxides can be used in conjunction with the corresponding metal stearate complex, or with stearic acid and other organic and fatty acids, and either a sulfur compound or an alkylperoxide compound. (See also, *Formulation Design and Curing Characteristics of NBR Mixes for Seals*, RUBBER WORLD 25-30 (1993). This method may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys), 2-(morpholinothio) benzothiazole (MBS or MOR), blends of 90% MOR and 10% MBTS (MOR90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas". As used herein, the term "thiourea" or "thioureas" include any number of compounds conforming the description as set out below.

In particular, at least one thiourea may be present as at least one accelerator in blends of the present invention. Thioureas are available from various commercial sources, and in many different structures. In one embodiment of the invention, the at least one thiourea present in the curable elastomeric blend of the invention has a structure represented by (1):

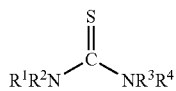

wherein $R^1$, $R^2$, $R^3$, and $R^4$ can be the same or different, and are radicals selected from hydrogen, methyl, ethyl, linear $C_3$ to $C_{20}$ alkyl, branched $C_3$ to $C_{20}$ alkyl, vinyl, linear $C_3$ to $C_{20}$ alkenyl, branched $C_3$ to $C_{20}$ alkenyl, substituted linear $C_3$ to $C_{20}$ alkyl, and substituted branched $C_3$ to $C_{20}$ alkyl. By "substituted", it is meant that the $R^{(1-4)}$ function group may be further substituted by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, 2,2,3,3-tetrafluoropropyl, and aryl groups such as a phenyl, naphthyl, pyridyl, or substituted phenyl, naphthyl, or pyridyl, "substituted" having the same meaning as above. In another embodiment, any one of $R^1$ or $R^2$ may form a ring system with either one of $R^3$ or $R^4$.

In another embodiment, the thiourea is selected from $H_4$-thiourea ($R^{1-4}$ is hydrogen), methylthiourea, ethylthiourea, propylthiourea, isopropythiourea, butylthiourea, isobutylthiourea, tert-butylthiourea, 1,3-dimethylthiourea, 1,3-diethylthiourea, 1,3-dipropylthiourea, 1,3-dibutylthiourea, 1,3-di-tert-butylthiourea, 1,3-diisobutylthiourea, 1,3-diisopropylthiourea, 1,3-dipentylthiourea, 1,3-diisopentylthiourea, 1,3-diphenylthiourea, 1,1,3-trimethylthiourea, ethylene thiourea (2-mercaptoimidazole), and blends thereof. It is understood that, for the alkyl-substituted thioureas, a hydrogen is in any of the remaining positions on the nitrogen. In another embodiment, the thiourea is selected from various mono, di, tri or tetra-substituted butyl isomers ($R^{1-4}$ is any isomer of $C_4$) such as, for example, butylthiourea, isobutylthiourea, tert-butylthiourea, 1,3-dibutylthiourea, 1,3-di-tert-butylthiourea, 1,3-diisobutylthiourea, and mixtures thereof. The thiourea cure agent is not herein limited by its commercial chemical form, such as, for example, a mono-, di-basic, etc., salt, or to its physical form such as liquid, solution, slurry or solid.

The thiourea is added as a cure agent, or accelerator, to the composition to facilitate the cure of the composition and achieve the desired physical and dynamic properties. The thiourea can be added in any amount from 0.1 to 3 phr in one embodiment, and from 0.2 to 1.5 phr in another embodiment, and from 0.25 to 1.0 phr in yet another embodiment, wherein the desirable range of thiourea can be any combination of any upper phr limit with any lower phr limit.

The elastomers and other materials to be used in making a desirable article are mixed by conventional means known to those skilled in the art, in a single step or in stages. For example, the elastomers of this invention can be processed in one step. In one embodiment, the carbon black is added in a different stage from zinc oxide and other cure activators and accelerators. In another embodiment, antioxidants, antiozonants and processing materials are added in a stage after the carbon black has been processed with the elastomeric composition, and zinc oxide is added at a final stage to maximize compound modulus. Thus, a two to three (or more) stage processing sequence is desirable in one embodiment. Additional stages may involve incremental additions of filler and processing aids.

The compositions may be vulcanized by subjecting them to heat or radiation according to any conventional vulcanization process. Typically, the vulcanization is conducted at a temperature ranging from about 100° C. to about 250° C. in one embodiment, from 125° C. to 200° C. in another embodiment, for about 1 to 150 minutes.

Suitable elastomeric compositions for such abrasion resistant articles as tire treads may be prepared by using conventional mixing techniques including, for example, kneading, roller milling, extruder mixing, internal mixing (such as with a Banbury™ mixer), etc. The sequence of mixing and temperatures employed are well known to those skilled in rubber compounding, the objective being the dispersion of fillers, activator, and curatives in the rubber matrix without excessive heat buildup. A useful mixing procedure utilizes a Banbury™ mixer in which the elastomeric components, carbon black, and other components are mixed for the desired time or to a particular temperature to achieve adequate dispersion of the ingredients.

The final cured elastomeric compositions of the invention can be characterized by several properties such as, for example, DIN Abrasion values and the Tangent Delta values. An ideal composition suitable for a shoe sole or a tire tread or sidewall will have a DIN Abrasion Index value of at least 100, and Tangent Delta (G"/G') values of greater than 0.300 at −30° C. and 0° C. This set of parameters represents a composition having acceptable abrasion resistance as well as suitable grip for a tire tread or shoe sole. Various embodiments of compositions may have a DIN Abrasion Index of greater than 100 in one embodiment, or greater than 150 in another embodiment, or greater than 170 in another embodiment, or greater than 190 in another embodiment, or greater than 200 in yet another embodiment, or greater than 220 in yet another embodiment, or greater than 230 in yet another embodiment, or less than 700 in one embodiment, or less than 600 in another embodiment, or less than 500 in yet another embodiment, a desirable embodiment including any lower DIN Abrasion Index limit, or any combination of any upper DIN Abrasion value and any lower DIN Abrasion value.

Further, various embodiment of the compositions may have certain desirable Tangent Delta ranges at a specified temperature. In one embodiment, the Tangent Delta (G"/G') values at −30° C. are less than 1.00 in one embodiment, and less than 0.800 in another embodiment, and less than 0.600 in yet another embodiment, and less than 0.500 in yet another embodiment, and less than 0.400 in yet another embodiment, and less than 0.350 in yet another embodiment, and greater than 0.250 in another embodiment, and greater than 0.300 in yet another embodiment, and greater than 0.350 in yet another embodiment, and greater than 0.400 in yet another embodiment, and greater than 0.450 in yet another embodiment, wherein a desirable embodiment may include any one or combination of any upper Tangent Delta value and any lower Tangent Delta value. In a desirable embodiment, the Tangent Delta (G"/G') value at −30° C. is greater than 0.300.

Further, the Tangent Delta (G"/G') values at 0° C. are less than 1.00 in one embodiment, and less than 0.800 in another embodiment, and less than 0.600 in yet another embodiment, and less than 0.500 in yet another embodiment, and less than 0.400 in yet another embodiment, and less than 0.350 in yet another embodiment, and greater than 0.100 in one embodiment, and greater than 0.150 in another embodiment, and greater than 0.200 in yet another embodiment, and greater than 0.250 in yet another embodiment and greater than 0.300 in yet another embodiment, and greater than 0.350 in yet another embodiment and greater than 0.500 in yet another embodiment, wherein a desirable embodiment may include any one or combination of any upper Tangent Delta value and any lower Tangent Delta value. In a desirable embodiment, the Tangent Delta (G"/G') values at 0° C. are greater than 0.300.

The compositions of the present invention are suitable for abrasion resistant, high traction articles such as, for example, pneumatic tire components and solid tire components, footwear components, and more particularly shoe soles and other shoe components, tire treads and sidewalls, belts, air barriers such as innertubes, bladders and innerliners and other articles.

Test Methods

Cure properties were measured using a MDR 2000 at the indicated temperature and 0.5 degree arc. Test specimens were cured at the indicated temperature, typically from 150° C. to 160° C., for a time (in minutes) corresponding to T90+ appropriate mold lag. When possible, standard ASTM tests were used to determine the cured compound physical properties as shown in Table 1. Stress/strain properties (tensile strength, elongation at break, modulus values, energy to break) were measured at room temperature using an Instron 4202 or Instron 4204. Shore A hardness was measured at room temperature by using a Zwick Duromatic. The error (2σ) in measuring 100% Modulus is ±0.11 MPa units; the error (2σ) in measuring elongation is ±13% units. The error (2σ) in tensile measurements is ±0.47 MPa units.

Abrasion loss was determined at room temperature by weight difference by using an APH-40 (Hampden, North Hampton) Abrasion Tester with rotating sample holder (5 N counter balance) and rotating drum. Weight losses were Indexed to that of the standard DIN compound with lower losses indicative of a higher DIN Abrasion resistance Index. The DIN Standard is a specified rubber compound formulation according to DIN 53516, ASTM D 5963 Annex A1 Table A1.1 and ISO 4649 Annex B. The specification for the standard abrasive cloth is also located in ISO 4649 Annex A and ASTM D 5963 section 7.2. The reference rubber is obtained in certified sheets (Hampden, Germany, B.A.M.). The values in the tables below are the average of three runs. Test results are reported as "abrasion resistance Index" (ARI). This is the ratio of volume loss of the Standard Rubber (SR) to the volume loss of the test rubber expressed in percent. The Standard Rubber loss establishes the base line (100). Test samples with a loss of less than the Standard have an ARI of more than 100 and those test samples with more loss than the Standard have an ARI of less than 100. The calculation is: (SR loss/Test sample loss)×100=ARI. The weight losses can be measured with an error of ±5%.

Dynamic properties (G*, G', G" and tangent delta) were determined using a MTS 831 mechanical spectrometer for pure shear specimens (double lap shear geometry) at temperatures of −20° C., 0° C. and 60° C. using a 1 Hz frequency at 0.1, 2 and 10% strains. Temperature-dependent (−80° C. to 60° C.) dynamic properties were obtained using a Rheometrics ARES at Sid Richardson Carbon Company, Fort Worth, Tex. and at ExxonMobil Chemical, Baytown, Tex. A rectangular torsion sample geometry was tested at 1 Hz and appropriate strain. Values of G" or Tangent Delta measured at 0° C. in laboratory dynamic testing can be used as predictors of tire traction for carbon black-filled BR/sSBR (styrene-butadiene rubber) compounds. Temperature-dependent (−90° C. to 60° C.) high-frequency acoustic measurements were performed using a frequency of 1 MHz and ethanol as the fluid medium. The Tangent Delta values have a margin of error of ±5%, while the temperature is measured with an error of ±1° C. Values of G" or Tangent Delta measured in the range from −10° C. to 10° C. (e.g., 0° C.) in laboratory dynamic testing can be used as predictors of tire wet traction, while values of from −20° C. to −40° C. (e.g., −30° C.) are used to predict winter traction.

EXAMPLES

The present invention, while not meant to be limiting by, may be better understood by reference to the following examples and Tables. Table 2 summarizes the various components used in the examples, and their commercial names and sources.

Example 1

In the first Example, samples compositions 1-6, compositions and properties for which are shown in Table 3, were cured and tested for DIN Abrasion resistance. These sample compositions represent embodiments suitable for a curing bladder, innertube or innerliner (100 phr BIMS), or a tire component such as a tread or sidewall. The components were blended in a BR size Banbury internal mixer, TCU 75° F. (24° C.), 60 rpm, elastomers added at time zero, followed by addition of carbon black at 30 seconds of mixing. Next, addition and sweep at 250° F. (121° C.) on BB temperature, using inclusion bag. Remaining ingredients added at 150 seconds of mixing, followed by dump at 320° F. (160° C.) at 300 seconds, thus forming the masterbatch. In the final pass, TCU max cooling, 45 rpm, 30 psi, the masterbatch was mixed for 30 seconds, upon which the sulfur accelerators (thiourea, zinc oxide, DPG and MBTS) were added, followed by a sweep at 90 seconds, and dump at 221° F. (105° C.) at 180 seconds. Six cuts were made and 6 rolls on a 2-roll mill.

The samples 1-6 demonstrate that the addition of a thiourea, in this case 1,3-dibutylthiourea, improves the DIN Abrasion Index of the various elastomeric compositions. In particular, the sample 4, which includes a 60/40 phr blend of BIMS/BR shows the most advantageous DIN Abrasion value. The sample 6 composition of a 60/40 phr of BIMS/NR blend also has a desirable DIN Abrasion, when the thiourea is present at 0.3 phr. Samples 2, 4 and 6 show higher DIN Abrasion values than the control samples 1, 3 and 5, respectively, with thiourea present only in samples 2, 4 and 6.

Example 2

The second Example comprises samples 7-15, compositions and data for which are found in Tables 4 and 5. These sample compositions represent embodiments of the invention composition suitable for shoe soles. The samples 7-15 further demonstrate that the addition of a thiourea, in this case 1,3-dibutylthiourea, improves the DIN Abrasion Index of the various elastomeric compositions. The samples comprise the components listed in the Table 3, as well as the following: 3 phr naphthenic oil; 2 phr silica coupling agent; 3 phr polyethylene glycol; 3 phr ZnO, 1.2 phr PERKACIT MBTS; 0.2 phr PERKACIT MBT; 0.5 phr stearic acid; 0.5 phr BHT; 38 phr silica (ULTRASIL VN3); and 1 phr sulfur. The samples were mixed in a BR Banbury mixer, first pass at 300 seconds, batch temperature of 285-320° F. (141-160° C.), and a final pass of 180 seconds at a batch temperature of from 165-190° F. (74-88° C.). The measured properties of the compositions are as listed in the table. Cure properties of all of the samples 7-15 ranged as follows: the ML (dN·m) values ranged from 2.88 and 3.18; the MH (dN·m) values ranged from 15.34 to 18.15; the MH-ML values ranged from 12.81 to 15.14; the t50 (min) values ranged from 2.32 to 5.35; the t90 values ranged from 4.2 to 11.93; and the Mooney scorch, t5 (min) values ranged from 2.83 to 8.62.

In comparing the data in the second Example, it is apparent that 0.5 phr of the thiourea improved the DIN Abrasion Index values in general, and especially when the thiuram was absent. For example, in comparing samples 15, 9, and 12, each having 0.5 phr of thiourea present, the DIN Abrasion Index increased from 226 when 0.3 phr thiuram was present, to 290 when 0.15 phr thiuram was present. Thus, a cure system comprising less than, for example, 0.3 phr thiuram and at least 0.2 to 0.5 thiourea improves DIN Abrasion values for the given formulations. Further, when comparing samples 7, 14 and 12 (increasing levels of thiourea, no thiuram), the DIN Abrasion Index rose from 241 to 254 to 293, respectively.

Dynamic properties were measured as Tangent Delta values at from −80° C. to 60° C., and listed at −30° C., 0° C., 30° C., and 60° C. in Table 4. Samples 7, 14, 12 and 17 are fully plotted in FIG. 1. The plot for sample 17, which comes from the next example, is placed to show the relative peaks for the SNBR with BR, absent the BIMS. These data show that there is only a relatively small change in the Tangent Delta values when the levels of thiourea are changed. This indicates that the potential wet and/or winter traction of the samples is maintained to a significant degree when the levels of thiourea varies between 0 and 0.5 phr. Thus, the DIN Abrasion Index can be improved without adverse effects upon the potential traction of the various BIMS/BR/SNBR compositions.

Example 3

Figure 2:
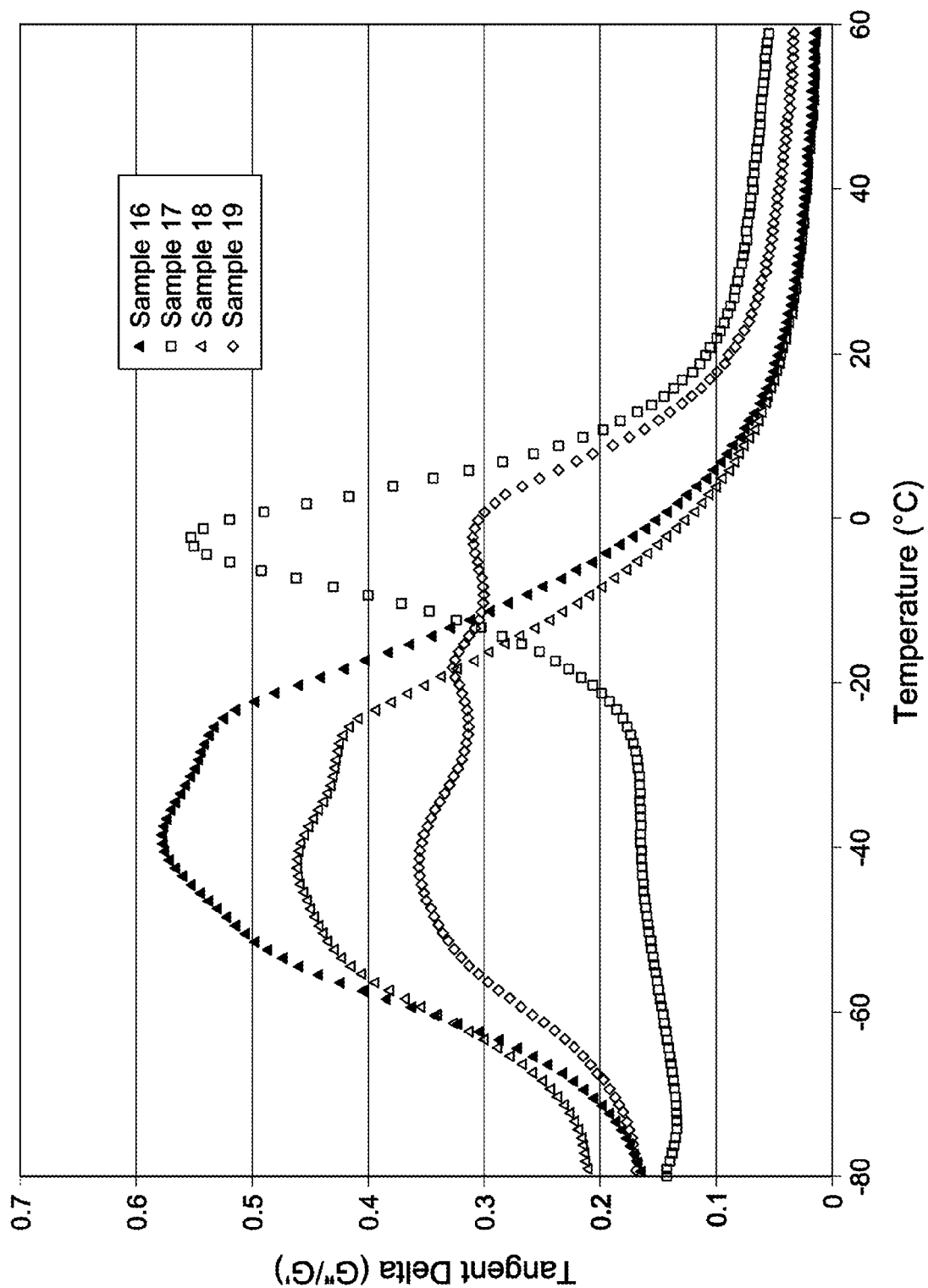
FIG. 2 is a representation of dynamic properties of samples 16, 17, 18, and 19 plotted as Tangent Delta (G"/G') as a function of temperature.

The third Example comprises samples 16-19, compositions and data for which are found in Tables 6 and 7, and FIG. 2. These sample compositions also demonstrate the usefulness of the compositions for shoe soles. These data further demonstrate the effects of varying the levels of the SNBR on the composition properties, as well as the level of thiourea, in the presence of two types of commercially available silicas. Other components, which are the same for each sample, include the following: 3 phr CALSOL 810 process oil; 2 phr Si 69 coupling agent; 3 phr CARBOWAX; 3 phr KADOX 930C zinc oxide; 0.5 phr BHT antioxidant; 1.7 phr sulfur; 1.2 phr PERKACIT MBTS; 0.3 phr MONEX; 0.2 phr PERKACIT MBT; 0.5 phr stearic acid; and 1 phr 1,3-dibutylthiourea. The cure properties can be summarized by the following ranges of values for the examples 19-22: the ML (dN·m) values ranged from 3.27 and 4.81; the MH (dN·m) values ranged from 22.39 to 27.2; the MH-ML values ranged from 19.12 to 23.19; the t50 (min) values ranged from 1.06 to 2.23; the t90 values ranged from 3.67 to 5.6; and the Mooney scorch, t5 (min) values ranged from 2.77 to 4.25.

These data further demonstrate the utility and advantages of the BIMS/BR/SNBR combination of elastomers cured in the presence of a thiourea. For example, when BIMS is added to the combination of BR and SNBR (samples 16, 18 and 19), the Tangent Delta values increase at low temperatures, thus indicating improved wet or ice traction, while the DIN Abrasion Index values are maintained at an acceptable level of at least 174 or higher. By optimizing the ratios of BIMS/BR/SNBR, and the amount of thiourea, the dynamic properties and physical properties can thus be balanced for a given need, such as shoe soles or tire sidewalls.

Example 4

The fourth Example comprises samples 20-22, compositions and data for which are shown in Tables 8 and 9. These sample compositions represent embodiments suitable for shoe soles. These data demonstrate the effects of varying the levels of the SNBR on the composition properties, as well as the level of thiourea. The samples comprise the components listed in the Table 8, as well as the following: 3 phr naphthenic oil; 2 phr silica coupling agent; 3 phr polyethylene glycol; 3 phr ZnO, 1.2 phr PERKACIT MBTS; 0.2 phr PERKACIT MBT; 0.5 phr stearic acid; 0.5 phr BHT; 38 phr silica (ULTRASIL VN3); and 1 phr sulfur. Further, the samples were mixed as in Example 3. Physical properties are listed in Table 8, and dynamic properties are in Table 9, with the selected values of samples 11, 20, 21, and 22 fully plotted in FIG. 3. Sample 11 from Example 2 is included for reference. Cure properties of all of the samples 20-22 range as follows: the ML (dN·m) values ranged from 3.08 and 3.85; the MH (dN·m) values ranged from 15.04 to 27.45; the MH-ML values ranged from 11.96 to 23.6; the t50 (min) values ranged from 1.18 to 3.99; the t90 values ranged from 2.8 to 8.31; and the Mooney scorch, t5 (min) values ranged from 2.27 to 6.75.

The data in samples 20-22 show that by adjusting the amounts of BIMS, BR and SNBR, in the presence of a desirable level of thiourea, the DIN Abrasion Index can be optimized (increased), while the dynamic properties, which are indicators of traction, can also be improved. For example, sample composition 22 has a higher Tangent Delta at 0° C. (wet traction) value of 0.446 compared to samples 11 and 21, while maintaining an acceptable DIN Abrasion of 192. The data in FIG. 3 shows this graphically, and highlights the advantages of adjusting the levels of the elastomers in the presence of the thiourea.

Example 5

The fifth Example comprises samples 23-26, composition and abrasion data for which are in Table 10, and represents embodiments suitable for a shoe sole. Other components, which are the same for each sample, include the following: 10 phr PARAPOL 950 processing oil; 0.5 phr TRIGONOX 29. The components were blended much as stated above: the elastomers were blended in a BR Banbury blender at 60 psi ram pressure, 60 rpm for 30 seconds, followed by addition of the silicas and 90 seconds more blending (120 seconds total). Total blend time of these components was 360 seconds, dump temperature was 135° C. Next, in the Banbury blender, at 60 psi and 60 rpm, the silica/elastomer blend was mixed, followed by addition of the curatives (thiourea, zinc stearate and TRIGONOX 29). The final blend was cut and tested.

A summary of the cure properties of the blends 23-26 are as follows: MDR 2, 150° C., 0.5° ARC: ML (dN·m) values ranged from 2.69 to 3.1, MH (dN·m) values ranged from 7.18 to 8.86; MH-ML values ranged from 4.27 to 6.17; ts2 (sec) ranges from 1.21 to 1.48; t50 (sec) ranges from 1.58 to 1.94; t90 (sec) ranges from 6.87 to 8.58; and MS at 135° C., 5 pt ranged from 3.13 to 3.57.

These data show that a composition using thiourea as a curative is effective for shoe sole formulations even when a peroxide (TRIGONOX 29) is used instead of sulfur. The data also demonstrates the use of IR in blends with BR and BIMS. The increase of zinc stearate in samples 25 and 26 had little to no effect on the DIN Abrasion Index values. The increase in thiourea in samples 24 and 26 increased DIN Abrasion Index Values.

Example 6

The sixth Example comprises samples 27 and 28, composition and abrasion data for which are in Table 11, and represents embodiments suitable for a tire tread or sidewall. Other components, which are the same for each sample, include the following: 6 phr of X50S silane; 30 phr SUNDEX 8125 processing oil; 2 phr DPG; 2 phr zinc oxide, KADOX 930C; 1 phr stearic acid; 1.5 phr SANTOFLEX 13; 1 phr AgeRite Resin D; 0.75 phr sulfur; 1 phr TBBS; and 0.5 phr DHT 4A2. Blending of the components is as above. A summary of the cure properties of the blends 27 and 28 are as follows: MDR 2000, 160° C., 0.5° ARC: ML (dN·m) values ranged from 4.59 to 4.81, MH (dN·m) values ranged from 13.71 to 14.29; MH-ML values ranged from 9.12 to 9,48; ts2 (sec) ranges from 1.2 to 1.3; t50 (sec) ranges from 3.03 to 4.13; and t90 (sec) ranges from 8.11 to 11.45. These data show that a colorable sidewall or tread formulation having a suitable DIN Abrasion Index value can be achieved when a thiourea is used as a curative.

Example 7

The seventh Example comprises samples 29 and 30, composition and abrasion data for which are in Table 12, and represents embodiments suitable for a tire tread or sidewall. Other components, which are the same for each sample, include the following: 30 phr SUNDEX 8125; 1.25 phr stearic acid; 1.5 phr SANTOFLEX 13; 1 phr AgeRite Resin D; 2.5 phr KADOX 930C; and 0.5 phr sulfur; 1.5 phr TBBS. A summary of the cure properties of the blends 29 and 30 are as follows: MDR 2000, 160° C., 0.5° ARC: ML (dN·m) values ranged from 2.88 to 4.91, MH (dN·m) values ranged from 11.10 to 12.52; MH-ML values ranged from 7.61 to 8.22; ts2 (sec) ranges from 2.80 to 4.25; t50 (sec) ranges from 3.63 to 6.00; and t90 (sec) ranges from 15.70 to 22.76. These data show the utility of a carbon black filled tire sidewall or tread using the thiourea curative. The Abrasion Index is improved by the use of the thiourea, thus making the blend suitable for a tire component.

The examples demonstrate that a wide variety of compositions including the thiourea cure agent with the BIMS, or BIMS blends with other elastomers such as BR and/or NR, are suitable for an abrasion resistant article having good traction. For example, a composition including from 10 to 60 phr of BIMS with from 5 to 70 phr of BR and 5 to 50 phr of SNBR, including a cure agent of from 0.1 to 3 phr thiourea, is desirable. In another embodiment, from 15 to 40 phr of BIMS with from 10 to 40 phr BR and from 10 to 40 phr of SNBR with from 0.2 to 2 phr of the thiourea is desirable. In yet another embodiment, from 15 to 35 phr of BIMS with from 40 to 70 phr BR and 15 to 35 phr SNBR, with from 0.25 to 1 phr of thiourea is desirable. In yet another embodiment, from 15 to 40 phr of BIMS with from 40 to 70 phr BR and from 10 to 40 phr SNBR, with from 0.2 to 2 phr of thiourea is desirable.

Other combinations may also be desirable, such as, for instance, from 10 to 60 phr BIMS with from 40 to 70 phr BR, 15 to 35 phr SNBR, and from 0.1 to 3 phr thiourea. In a particularly desirable embodiment is a formulation including from 35 to 40 phr silica, 35 to 45 phr BIMS, 25 to 35 phr BR, 25 to 35 phr SNBR, and from 0.20 to 0.30 1,3-dibutylthiourea, the sulfur/zinc oxide cured composition having a DIN Abrasion Index of greater than 180, a Tangent Delta at −30° C. of from 0.370 to 0.400, and a Tangent Delta at 0° C. of from 0.430 to 0.455. An embodiment of a 55 to 65 phr carbon black filled composition, including from 55 to 65 phr BIMS, from 35 to 45 phr BR and from 0.2 to 0.40 phr 1,3-dibutylthiourea, the sulfur/zinc oxide cured composition has a DIN Abrasion Index of greater than 135 is also desirable. As demonstrated above, the various amount of these components can be manipulated to achieve an optimal formulation for a desirable article having the required physical and dynamic properties.

More particularly, the compositions and articles made from those compositions of the invention can be described in any number of additional embodiments. For example, the invention can be described as a composition suitable for an abrasion resistant article comprising from 10 to 60 phr of a terpolymer of $C_4$ to $C_7$ isoolefin derived units, p-alkylstyrene derived units and p-bromomethylstyrene derived units; at least one filler such as carbon black, silica, precipitated silica, clay, or combinations thereof, and from 0.1 to 3 phr of at least one thiourea. The composition can also include from 5 to 80 phr of at least one elastomer selected from natural rubbers, polyisoprene rubber, styrene-butadiene rubber (SBR), polybutadiene rubber, isoprene-butadiene rubber (IBR), styrene-isoprene-butadiene rubber (SIBR), butyl rubber, halogenated butyl rubber, butadiene-acrylonitrile-styrene rubber (SNBR), and mixtures thereof. The composition can be cured by using one or a combination of curatives known in the rubber industry. For example, the composition may include from 0.1 to 10 phr of at least one of a peroxide, sulfur, a metal oxide, or a combination thereof. In a further embodiment, the thiourea is present from 0.2 to 1 phr in the composition.

The "thiourea" present in the composition improves the overall performance of the cured composition, making it ideally suited for abrasion resistant articles, and even air barriers such as bladders and innerliners, in compositions including at least one BIMS. The at least one thiourea may be selected from the group of structures represented by:

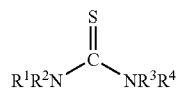

wherein $R^1$, $R^2$, $R^3$, and $R^4$ can be the same or different, and are radicals selected from hydrogen, methyl, ethyl, linear $C_3$ to $C_{20}$ alkyl, branched $C_3$ to $C_{20}$ alkyl, vinyl, linear $C_3$ to $C_{20}$ alkenyl, branched $C_3$ to $C_{20}$ alkenyl, substituted linear $C_3$ to $C_{20}$ alkyl, and substituted branched $C_3$ to $C_{20}$ alkyl.

Described another way, the at least one thiourea is selected from $H_4$-thiourea, methylthiourea, ethylthiourea, propylthiourea, isopropylthiourea, butylthiourea, isobutylthiourea, tert-butylthiourea, 1,3-dimethylthiourea, 1,3-diethylthiourea, 1,3-dipropylthiourea, 1,3-dibutylthiourea, 1,3-di-tert-butylthiourea, 1,3-diisobutylthiourea, 1,3-diisopropylthiourea, 1,3-dipentylthiourea, 1,3-diisopentylthiourea, 1,3-diphenylthiourea, 1,1,3-trimethylthiourea, ethylene thiourea (2-mercaptoimidazole), and blends thereof. In yet another embodiment of the composition, the thiourea is selected from butylthiourea, isobutylthiourea, tert-butylthiourea, 1,3-dibutylthiourea, 1,3-di-tert-butylthiourea, 1,3-diisobutylthiourea, and mixtures thereof.

The composition may include certain elastomers in order to balance desirable properties of the composition. In one embodiment, from 5 to 50 phr of SNBR is included in the composition. In another embodiment, the composition includes from 5 to 60 phr of BR, and from 5 to 50 phr of NR in another embodiment, or from 5 to 50 phr of IR in yet another embodiment. In another embodiment, a blend of BR/SNBR is included with the BIMS composition, and a BR/NR blend in another embodiment, and a BR/IR blend in yet another embodiment.

The compositions, and articles made from the compositions, of the BIMS and thiourea and filler has improved abrasion resistance as measured by the DIN Abrasion Index. In one embodiment, the DIN Abrasion Index is greater than 100, and greater than 130 in another embodiment, and greater than 190 in yet another embodiment. Further, the grip or traction of the cured composition is also improved as measured by the Tangent Delta (G"/G') (or, Tan Delta). In one embodiment, the Tangent Delta at −30° C. is from greater than 0.300, and Tangent Delta at 0° C. is from greater than 0.300.

In another embodiment, an abrasion resistant article is formed from the composition of from 10 to 60 phr of a terpolymer of $C_4$ to $C_7$ isoolefin derived units, p-alkylstyrene derived units and p-bromomethylstyrene derived units; at least one filler; and from 0.1 to 3 phr of at least one thiourea; wherein the cured composition has a Tangent Delta at −30° C. and 0° C. of greater than 0.300 and a DIN Abrasion Index of greater than 100.

In yet another embodiment, an abrasion resistant article is formed from the composition of from 10 to 80 phr of a terpolymer of $C_4$ to $C_7$ isoolefin derived units, p-alkylstyrene derived units and p-bromomethylstyrene derived units; a filler; an elastomer selected from polyisoprene, natural rubber, polybutadiene and butadiene-acrylonitrile-styrene rubber (SNBR); and from 0.1 to 3 phr of at least one thiourea; wherein the cured composition has a Tangent Delta at −30° C. and 0° C. of greater than 0.300 and a DIN Abrasion Index of greater than 100.

In yet another embodiment, an abrasion resistant article suitable for an air barrier is formed from the composition of from 10 to 100 phr of a terpolymer of $C_4$ to $C_7$ isoolefin derived units, p-alkylstyrene derived units and p-bromomethylstyrene derived units; carbon black; and from 0.1 to 3 phr of at least one thiourea; wherein the cured composition has a Tangent Delta at −30° C. and 0° C. of greater than 0.200 and a DIN Abrasion Index of greater than 100.

And in yet another embodiment, a composition suitable for an abrasion resistant article is formed from a composition comprising from 35 to 45 phr of a terpolymer of $C_4$ to $C_7$ isoolefin derived units, p-alkylstyrene derived units and p-bromomethylstyrene derived units; from 25 to 35 phr of polybutadiene; from 25 to 35 phr of butadiene-acrylonitrile-styrene rubber; from 30 to 45 phr of at least one silica; and from 0.1 to 3 phr of at least one thiourea.

Another embodiment of the composition suitable for an abrasion resistant article of the invention includes from 15 to 45 phr of a terpolymer of $C_4$ to $C_7$ isoolefin derived units, p-alkylstyrene derived units and p-bromomethylstyrene derived units; from 25 to 70 phr of polybutadiene; from 25 to 35 phr of butadiene-acrylonitrile-styrene rubber; from 30 to 45 phr of at least one silica; and from 0.1 to 3 phr of at least one thiourea.

And in yet another embodiment of the invention, a composition suitable for an abrasion resistant article includes from 35 to 55 phr of a terpolymer of $C_4$ to $C_7$ isoolefin derived units, p-alkylstyrene derived units and p-bromomethylstyrene derived units; from 20 to 45 phr of polybutadiene; from 15 to 30 phr of an elastomer selected from natural rubber and polyisoprene; from 50 to 80 phr of a filler selected from carbon black, silica, or blends thereof, and from 0.1 to 3 phr of at least one thiourea.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Test Methods

| Parameter | Units | Test |
|---|---|---|
| Mooney Viscosity (BIMS polymer) | ML 1 + 8, 125° C., MU, ±5 MU | ASTM D 1646 (modified) |
| Mooney Viscosity (composition) | ML 1 + 4, 100° C., MU | ASTM D 1646 |
| Mooney Scorch Time | $T_S5$, 125° C., minutes | ASTM D 1646 |
| Moving Die Rheometer (MDR) @ 160° C., ±0.5° arc | | |
| ML | dN · m | |
| MH | dN · m | |
| $T_S2$ | minute | |
| $T_C90$ | minute | |
| Cure rate | dN · m/minute | ASTM D 2084 |

TABLE 1-continued

Test Methods

| Parameter | Units | Test |
|---|---|---|
| Physical Properties press cured Tc 90 + 2 min @ 160° C. | | |
| Hardness | Shore A | ASTM D 2240 |
| Modulus 100% | MPa | ASTM D 412 die C |
| Tensile Strength | MPa | |
| Elongation at Break | % | |
| Tear Strength | N/mm | ASTM D 624 |
| Die B & Die C | | |

TABLE 2

Components and Commercial Sources

| Component (trade name) | Description | Source |
|---|---|---|
| AEROSIL 200 | hydrophobic amorphous fumed silica | Degussa Corp. |
| AgeRite Resin D | polymerized 1,2-dihydro-2,2,4-trimethylquinoline | R. T. Vanderbilt, Co. |
| BHT | butylated hydroxytoluene | Rhodia |
| BIMS 1 (EXXPRO™ 89-1) | brominated poly(isobutylene-co-p-methylstyrene), 0.75 ± 0.07 mol % benzylic Br; 5 ± 0.5 p-methylstyrene, Mooney Viscosity of 38 MU (1 + 8, 125° C.) | ExxonMobil Chemical Co. (Houston, TX) |
| BIMS 2 (EXXPRO™ 90-10) | brominated poly(isobutylene-co-p-methylstyrene), 1.2 ± 0.1 mol % benzylic Br; 7.5 ± 0.5 p-methylstyrene, Mooney Viscosity of 45 MU (1 + 8, 125° C.) | ExxonMobil Chemical Co. (Houston, TX) |
| BR (BUDENE™ 1207) | polybutadiene | Goodyear Chemical |
| CARBOWAX | polyethylene glycol silica activator | Harwick Standard |
| carbon black (N330) | furnace black filler | Sid Richardson Carbon |
| DHT 4A2 | magnesium aluminum hydroxy carbonate | Kyowa Chemical Co. (Japan) |
| DPG (PERKACIT DPG) | N,N'-diphenylguanidine | Flexsys America L.P. |
| PARAPOL™ 950 | polybutene processing oil, 900-1000 number average molecular weight. | ExxonMobil Chemical Co. |
| PERKACIT MBTS | 2,2'-dithiobis(benzothiazole) | Harwick Standard |
| PERKACIT MBT | 2-mercaptobenzothiazoles | Harwick Standard |
| HYSTRENE 5016 NF | stearic acid | Witco |
| MBTS (ALTAX) | 2,2'-dithiobis(benzothiazole) | R. T. Vanderbilt |
| naphthenic oil (CALSOL 810) | hydrotreated naphthenic oil | R. E. Carroll |
| NR | natural rubber, natural polyisoprene | Akrochem Corp. |
| SANTOFLEX 13 | N-1,3-dimethylbutyl-N'-phenyl-p-phenylene diamine | Flexsys America, L.P. |
| silica coupling agent (X50S) | Si69, 50 wt % carbon black blend | Degussa AG (Germany) |
| silica coupling agent (Si 69) | bis-(3-triethoxysilylpropyl)tetrasulfide | Degussa AG (Germany) |
| SNBR (KRYNAC VP, KA8802) | butadiene-acrylonitrile-styrene rubber; 20 wt % acrylonitrile, 22.5 wt % styrene, Mooney Viscosity of 50 MU (1 + 4, 100° C.). | Bayer Corp. |
| sulfur | elemental sulfur (99.9%) | Reagent Chemical & Research, Inc. (Middlesex, NJ) |

TABLE 2-continued

Components and Commercial Sources

| Component (trade name) | Description | Source |
|---|---|---|
| SUNDEX 8125 | highly aromatic oil | Sunoco, Inc. |
| TBBS (SANTOCURE) | N-t-butyl-2-benzothiazyl sulfenamide | Flexsys America L.P. |
| THIATE U | 1,3-dibutylthiourea | R. T. Vanderbilt |
| THIURAM (MONEX) | tetramethylthiuram monosulfide | Uniroyal Chemical |
| TRIGONOX 29 | 1,1-di(tert-butylperoxy)-3,3,5-trimethylcyclohexane | Akzo Nobel Chemicals Inc. |
| ULTRASIL VN3 | precipitated silica | Degussa-Huls |
| ZEOPOL 8745 | precipitated silica | J. M. Huber |
| ZEOSIL 45 | amorphous precipitated silica | Rhodia, Inc. (Cranbury, NJ) |
| zinc oxide (KADOX 930C) | purified, French press ZnO | Zinc Corp. of America (Monaca, Pa) |
| zinc stearate | curative | Ferro Corporation |

TABLE 3

Example 1 compositions and DIN Abrasion values.

| Component[1] (phr) | 1 | 2 | 3 | 4 | 5 | 6 |
|---|---|---|---|---|---|---|
| BIMS 1 | 100 | 100 | 60 | 60 | 60 | 60 |
| BR | — | — | 40 | 40 | — | — |
| NR | — | — | — | — | 40 | 40 |
| carbon black (N330) | 60 | 60 | 60 | 60 | 60 | 60 |
| aromatic oil | 5 | 5 | — | — | — | — |
| 1,3-dibutylthiourea | — | 0.5 | — | 0.3 | — | 0.3 |
| sulfur | 1.5 | — | 0.5 | 0.3 | 0.5 | 0.3 |
| zinc oxide | 5 | 3 | 3 | 3 | 3 | 3 |
| diphenylguanidine | 0.5 | — | 0.25 | — | 0.25 | — |
| MBTS | 1 | 0.5 | 1.5 | 1 | 1.5 | 1 |
| DIN Abrasion Index: | 96 | 105 | 119 | 142 | 114 | 120 |

[1]Stearic acid (HYSTRENE 5016NF) also present at 1 phr in each sample.

TABLE 4

Example 2 compositions and properties

| | 7 | 8 | 9 | 10 | 11 | 12 | 13 | 14 | 15 |
|---|---|---|---|---|---|---|---|---|---|
| Components (phr)[1] | | | | | | | | | |
| BIMS 1 | 30 | 30 | 30 | 30 | 30 | 30 | 30 | 30 | 30 |
| BR | 50 | 50 | 50 | 50 | 50 | 50 | 50 | 50 | 50 |
| SNBR | 20 | 20 | 20 | 20 | 20 | 20 | 20 | 20 | 20 |
| silica (ULTRASIL VN3) | 38 | 38 | 38 | 38 | 38 | 38 | 38 | 38 | 38 |
| thiuram | 0 | 0.3 | 0.15 | 0.3 | 0.15 | 0 | 0.15 | 0 | 0.3 |
| 1,3-dibutylthiourea | 0 | 0.25 | 0.5 | 0 | 0.25 | 0.5 | 0 | 0.25 | 0.5 |
| Properties[2] | | | | | | | | | |
| Shore A Hardness | 57 | 59 | 60 | 59 | 58 | 57 | 58 | 60 | 61 |
| 20% Modulus, MPa | 0.78 | 0.77 | 0.78 | 0.74 | 0.73 | 0.77 | 0.76 | 0.78 | 0.77 |
| 100% Modulus, MPa | 2.54 | 2.64 | 3.00 | 2.40 | 2.69 | 3.25 | 2.53 | 2.96 | 3.30 |
| Tensile, MPa | 12.87 | 12.11 | 9.41 | 9.66 | 10.30 | 10.45 | 11.72 | 10.70 | 9.22 |
| Elongation, % | 450.3 | 303.1 | 261.6 | 310.6 | 283.9 | 276.6 | 338.4 | 311.9 | 218.5 |
| Energy, N/mm | 7.9 | 5.4 | 3.7 | 4.5 | 4.7 | 4.4 | 5.2 | 5.0 | 2.5 |
| Tear Resistance, N/mm | 33.0 | 33.6 | 28.0 | 31.4 | 35.0 | 27.4 | 34.0 | 32.4 | 29.5 |
| DIN Abrasion Index | 241 | 220 | 290 | 199 | 237 | 293 | 213 | 254 | 226 |

[1]Compositions also include those components listed in the Description.
[2]Cure properties as listed in the Description.

TABLE 5

Dynamic properties of Example 2 compositions

| Tan delta (ARES @ 1 Hz, 2% strain) | 7 | 8 | 9 | 10 | 11 | 12 | 13 | 14 | 15 |
|---|---|---|---|---|---|---|---|---|---|
| G'-Pa @ −30° C. | 3.89E+07[†] | 3.57E+07 | 4.18E+07 | 3.30E+07 | 3.12E+07 | 3.50E+07 | 2.95E+07 | 3.43E+07 | 3.34E+07 |
| G"-Pa @ −30° C. | 1.47E+07 | 1.45E+07 | 1.63E+07 | 1.36E+07 | 1.35E+07 | 1.45E+07 | 1.27E+07 | 1.37E+07 | 1.38E+07 |

TABLE 5-continued

Dynamic properties of Example 2 compositions

| Tan delta (ARES @ 1 Hz, 2% strain) | 7 | 8 | 9 | 10 | 11 | 12 | 13 | 14 | 15 |
|---|---|---|---|---|---|---|---|---|---|
| G*-Pa @ −30° C. | 4.16E+07 | 3.85E+07 | 4.49E+07 | 3.57E+07 | 3.40E+07 | 3.79E+07 | 3.21E+07 | 3.70E+07 | 3.61E+07 |
| Tan Delta @ −30° C. | 0.379 | 0.406 | 0.391 | 0.412 | 0.431 | 0.415 | 0.429 | 0.400 | 0.412 |
| G'-Pa @ 0° C. | 5.41E+06 | 4.42E+06 | 4.61E+06 | 4.67E+06 | 4.10E+06 | 3.93E+06 | 5.07E+06 | 4.29E+06 | 4.51E+06 |
| G''-Pa @ 0° C. | 1.29E+06 | 1.14E+06 | 1.17E+06 | 1.24E+06 | 9.82E+05 | 9.22E+05 | 1.26E+06 | 1.19E+06 | 1.15E+06 |
| G*-Pa @ 0° C. | 5.57E+06 | 4.57E+06 | 4.75E+06 | 4.83E+06 | 4.22E+06 | 4.04E+06 | 5.22E+06 | 4.45E+06 | 4.66E+06 |
| Tan Delta @ 0° C. | 0.238 | 0.258 | 0.253 | 0.266 | 0.239 | 0.234 | 0.248 | 0.276 | 0.256 |
| G'-Pa @ 30° C. | 4.71E+06 | 3.65E+06 | 4.12E+06 | 3.45E+06 | 3.42E+06 | 3.60E+06 | 4.03E+06 | 3.35E+06 | 4.08E+06 |
| G''-Pa @ 30° C. | 2.54E+05 | 1.77E+05 | 1.83E+05 | 1.97E+05 | 1.53E+05 | 1.74E+05 | 2.09E+05 | 2.24E+05 | 1.63E+05 |
| G*-Pa @ 30° C. | 4.72E+06 | 3.66E+06 | 4.13E+06 | 3.46E+06 | 3.43E+06 | 3.61E+06 | 4.04E+06 | 3.36E+06 | 4.08E+06 |
| Tan Delta @ 30° C. | 0.0540 | 0.0485 | 0.0445 | 0.0571 | 0.0447 | 0.0484 | 0.0519 | 0.0668 | 0.0400 |
| G'-Pa @ 60° C. | 4.88E+06 | 4.12E+06 | 4.69E+06 | 3.67E+06 | 3.69E+06 | 4.07E+06 | 4.19E+06 | 3.50E+06 | 4.98E+06 |
| G''-Pa @ 60° C. | 1.84E+05 | 1.12E+05 | 1.08E+05 | 1.46E+05 | 1.07E+05 | 1.16E+05 | 1.57E+05 | 1.49E+05 | 93172.5 |
| G*-Pa @ 60° C. | 4.88E+06 | 4.12E+06 | 4.69E+06 | 3.67E+06 | 3.69E+06 | 4.07E+06 | 4.20E+06 | 3.50E+06 | 4.98E+06 |
| Tan Delta @ 60° C. | 0.0377 | 0.0272 | 0.0230 | 0.0399 | 0.0289 | 0.0286 | 0.0375 | 0.0427 | 0.0187 |

[†]The notation "E" denotes exponential of 10. Thus, the number 1.00E+06 is equivalent to $1.00 \times 10^6$.

TABLE 6

Example 3 compositions and properties

| | 16 | 17 | 18 | 19 |
|---|---|---|---|---|
| Components[1](phr) | | | | |
| BIMS 1 | 40 | — | 40 | 20 |
| BR | 60 | 60 | 60 | 60 |
| SNBR | — | 40 | — | 20 |
| silica, ULTRASIL VN3 | 38 | 38 | — | — |
| silica, ZEOPOL 8745 | — | — | 38 | 38 |
| Properties[2] | | | | |
| Shore A Hardness | 63 | 64 | 61 | 63 |
| 20% Modulus, MPa | 0.938 | 1.01 | 0.826 | 0.823 |
| 100% Modulus, MPa | 3.16 | 3.10 | 3.08 | 3.12 |
| Tensile, MPa | 8.43 | 12.12 | 7.57 | 7.50 |
| Elongation, % | 228.21 | 339.87 | 198.74 | 209.97 |
| Energy, N/mm | 2.658 | 6.565 | 2.197 | 2.524 |
| DIN Abrasion Index | 212 | 351 | 174 | 271 |

[1]Compositions also include those components listed in the Description.
[2]Cure properties as listed in the Description.

TABLE 7

Dynamic properties of Example 3 compositions

| Tan delta (ARES @ 1 Hz, 2% Strain) | 16 | 17 | 18 | 19 |
|---|---|---|---|---|
| G'-Pa @ −30° C. | 2.17E+07 | 1.43E+08 | 1.82E+07 | 4.39E+07 |
| G''-Pa @ −30° C. | 8.99E+06 | 2.36E+07 | 7.82E+06 | 1.41E+07 |
| G*-Pa @ −30° C. | 2.35E+07 | 1.45E+08 | 1.98E+07 | 4.61E+07 |
| Tan delta @ −30° C. | 0.550 | 0.165 | 0.429 | 0.321 |
| G'-Pa @ 0° C. | 5.68E+06 | 1.09E+07 | 5.70E+06 | 5.36E+06 |
| G''-Pa @ 0° C. | 7.92E+05 | 5.66E+06 | 7.22E+05 | 1.63E+06 |
| G*-Pa @ 0° C. | 5.73E+06 | 1.23E+07 | 5.74E+06 | 5.60E+06 |
| Tan delta @ 0° C. | 0.159 | 0.519 | 0.127 | 0.304 |
| G'-Pa @ 30° C. | 6.02E+06 | 5.29E+06 | 5.96E+06 | 3.55E+06 |
| G''-Pa @ 30° C. | 2.19E+05 | 4.26E+05 | 1.78E+05 | 2.01E+05 |
| G*-Pa @ 30° C. | 6.03E+06 | 5.31E+06 | 5.96E+06 | 3.55E+06 |
| Tan delta @ 30° C. | 0.0364 | 0.0805 | 0.0298 | 0.0567 |
| G'-Pa @ 60° C. | 6.98E+06 | 5.09E+06 | 6.79E+06 | 3.92E+06 |
| G''-Pa @ 60° C. | 1.34E+05 | 2.85E+05 | 96405 | 1.28E+05 |
| G*-Pa @ 60° C. | 6.98E+06 | 5.10E+06 | 6.79E+06 | 3.92E+06 |
| Tan delta @ 60° C. | 0.0192 | 0.0559 | 0.0142 | 0.0326 |

TABLE 8

Example 4 compositions and properties

| | 11 | 20 | 21 | 22 |
|---|---|---|---|---|
| Components[1](phr) | | | | |
| BIMS 1 | 30 | 60 | 50 | 40 |
| BR | 50 | — | 30 | 30 |
| SNBR | 20 | 40 | 20 | 30 |
| silica (ULTRASIL VN3) | 38 | 38 | 38 | 38 |
| thiuram | 0.15 | 0.3 | 0.15 | 0.15 |
| 1,3-dibutylthiourea | 0.25 | 1 | 0.25 | 0.25 |
| zinc oxide | 3 | 3 | 1.5 | 3 |
| Properties[2] | | | | |
| Shore A Hardness | 58 | 69 | 57 | 60 |
| 20% Modulus, MPa | 0.73 | 1.17 | 0.71 | 0.81 |
| 100% Modulus, MPa | 2.69 | 3.81 | 2.56 | 2.73 |
| Tensile, MPa | 10.30 | 12.10 | 9.82 | 12.67 |
| Elongation, % | 283.9 | 279.8 | 314.6 | 324.4 |
| Energy, N/mm | 4.7 | 5.2 | 4.6 | 6.4 |

TABLE 8-continued

Example 4 compositions and properties

|  | 11 | 20 | 21 | 22 |
|---|---|---|---|---|
| Tear Resistance, N/mm | 35.0 | 35.7 | 29.2 | 41.6 |
| DIN Abrasion Index | 237 | 261 | 265 | 192 |

[1]Compositions also include those components listed in the Description.
[2]Cure properties as listed in the Description.

TABLE 9

Dynamic properties of Example 4 compositions

| Tan Delta (ARES @ 1 Hz, 2% strain) | 11 | 20 | 21 | 22 |
|---|---|---|---|---|
| G'-Pa @ −30° C. | 3.12E+07 | 1.51E+08 | 3.04E+07 | 6.00E+07 |
| G"-Pa @ −30° C. | 1.35E+07 | 2.39E+07 | 1.30E+07 | 2.33E+07 |
| G*-Pa @ −30° C. | 3.40E+07 | 1.53E+08 | 3.30E+07 | 6.44E+07 |
| Tan delta @ −30° C. | 0.431 | 0.159 | 0.427 | 0.388 |
| G'-Pa @ 0° C. | 4.10E+06 | 1.08E+07 | 3.40E+06 | 4.91E+06 |
| G"-Pa @ 0° C. | 9.82E+05 | 5.62E+06 | 9.90E+05 | 2.19E+06 |
| G*-Pa @ 0° C. | 4.22E+06 | 1.22E+07 | 3.54E+06 | 5.37E+06 |
| Tan delta @ 0° C. | 0.239 | 0.519 | 0.291 | 0.446 |
| G'-Pa @ 30° C. | 3.42E+06 | 5.01E+06 | 2.93E+06 | 3.34E+06 |
| G"-Pa @ 30° C. | 1.53E+05 | 3.70E+05 | 1.77E+05 | 2.08E+05 |
| G*-Pa @ 30° C. | 3.43E+06 | 5.02E+06 | 2.93E+06 | 3.35E+06 |
| Tan delta @ 30° C. | 0.0447 | 0.0739 | 0.0605 | 0.0623 |
| G'-Pa @ 60° C. | 3.69E+06 | 4.91E+06 | 3.39E+06 | 3.74E+06 |
| G"-Pa @ 60° C. | 1.07E+05 | 2.42E+05 | 1.12E+05 | 1.26E+05 |
| G*-Pa @ 60° C. | 3.69E+06 | 4.91E+06 | 3.39E+06 | 3.74E+06 |
| Tan delta @ 60° C. | 0.0289 | 0.0493 | 0.0330 | 0.0338 |

TABLE 10

Example 5 compositions and properties

|  | 23 | 24 | 25 | 26 |
|---|---|---|---|---|
| Component[1](phr) | | | | |
| BIMS 1 | 50 | 50 | 50 | 50 |
| BR | 25 | 25 | 25 | 25 |
| IR | 25 | 25 | 25 | 25 |
| silica (ZEOSIL 45) | 25 | 25 | 25 | 25 |
| silica (AEROSIL 200) | 10 | 10 | 10 | 10 |
| zinc stearate | 3 | 3 | 5 | 5 |
| 1,3-dibutylthiourea | 0.5 | 1 | 0.5 | 1 |
| Properties[2] | | | | |
| 20% Modulus, MPa | 0.48 | 0.57 | 0.52 | 0.59 |
| 100% Modulus, MPa | 1.09 | 1.33 | 1.08 | 1.29 |
| 300% Modulus, MPa | 3.48 | 4.22 | 3.24 | 4.01 |
| Tensile, MPa | 6.28 | 10.13 | 7.7 | 10.69 |
| Elongation, % | 552 | 590 | 654 | 622 |
| Energy, N/mm | 5.35 | 8.08 | 7.23 | 8.6 |
| Shore A Hardness | 41.3 | 44.3 | 38.3 | 44.1 |
| DIN Abrasion Index | 76 | 133 | 68 | 133 |

[1]Compositions also include those components listed in the Description.
[2]Cure properties as listed in the Description.

TABLE 11

Example 6 compositions and properties

|  | 27 | 28 |
|---|---|---|
| Component[1] (phr) | | |
| BIMS 2 | 50 | 50 |
| BR | 25 | 25 |
| NR | 25 | 25 |
| silica (ZEOSIL 1165MP) | 75 | 75 |
| 1,3-dibutylthiourea | 0 | 0.25 |
| Properties[2] | | |
| 20% Modulus, MPa | 0.69 | 0.65 |
| 100% Modulus, MPa | 1.76 | 1.72 |
| 300% Modulus, MPa | 6.99 | 7.45 |
| Tensile, MPa | 12.77 | 14.23 |
| Elongation, % | 504 | 515 |
| Energy, N/mm | 9.76 | 10.62 |
| Shore A Hardness | 53.9 | 53.9 |
| DIN Abrasion Index | 98 | 114 |

[1]Compositions also include those components listed in the Description.
[2]Cure properties as listed in the Description.

TABLE 12

Example 7 compositions and properties

|  | 29 | 30 |
|---|---|---|
| Component[1] (phr) | | |
| BIMS 2 | 40 | 40 |
| BR | 40 | 40 |
| NR | 20 | 20 |
| carbon black (N234) | 60 | 60 |
| 1,3-dibutylthiourea | 0 | 0.5 |
| Properties[2] | | |
| 20% Modulus, MPa | 0.935 | 0.925 |
| 100% Modulus, MPa | 2.532 | 3.128 |
| 300% Modulus, MPa | 8.228 | 11.241 |
| Stress at Break | 14.686 | 15.571 |
| Elongation, % | 541 | 430 |
| Energy, N/mm | 12.938 | 11.671 |
| Tear Resistance | 71.128 | 73.778 |
| Shore A Hardness | 51.1 | 52.3 |
| DIN Abrasion Index | 117 | 128 |

[1]Compositions also include those components listed in the Description.
[2]Cure properties as listed in the Description.

We claim:

1. An abrasion resistant article comprising a composition of from 10 to 80 phr of a terpolymer of $C_4$ to $C_7$ isoolefin derived units, p-alkylstyrene derived units and p-bromomethylstyrene derived units; at least one filler; an elastomer selected from polyisoprene, natural rubber, polybutadiene and butadiene-acrylonitrile-styrene rubber; and from 0.1 to 3 phr of at least one thiourea selected from the group of structures represented by:

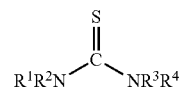

wherein $R^1$, $R^2$, $R^3$, and $R^4$ can be the same or different, and are radicals selected from hydrogen, methyl, ethyl, linear $C_3$ to $C_{20}$ alkyl, branched $C_3$ to $C_{20}$ alkyl, vinyl, linear $C_3$ to $C_{20}$ alkenyl, branched $C_3$ to $C_{20}$ alkenyl, substituted linear $C_3$ to $C_{20}$ alkyl, and substituted branched $C_3$ to $C_{20}$ alkyl; wherein the cured composition has a Tangent Delta at −30° C. and 0° of greater than 0.300 and a DIN Abrasion Index of greater than 100.

2. The article of claim 1, wherein the composition also includes from 0.1 to 10 phr of at least one of a peroxide, sulfur, a metal oxide, or a combination thereof.

3. The article of claim 1, wherein the thiourea is present from 0.2 to 1.5 phr.

4. The article of claim 1, wherein the at least one thiourea is selected from the group of structures represented by:

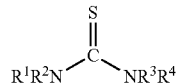

wherein $R^1$, $R^2$, $R^3$, and $R^4$ can be the same or different, and are radicals selected from hydrogen, methyl, ethyl, linear $C_3$ to $C_{20}$ alkyl, branched $C_3$ to $C_{20}$ alkyl, vinyl, linear $C_3$ to $C_{20}$ alkenyl, and branched $C_3$ to $C_{20}$ alkenyl.

5. The article of claim 1, wherein the at least one thiourea is selected from $H_4$-thiourea, methylthiourea, ethylthiourea, propylthiourea, isopropythiourea, butylthiourea, isobutylthiourea, tert-butylthiourea, 1,3-dimethylthiourea, 1,3-diethylthiourea, 1,3-dipropylthiourea, 1,3-dibutylthiourea, 1,3-di-tert-butylthiourea, 1,3-diisobutylthiourea, 1,3-diisopropylthiourea, 1,3-dipentylthiourea, 1,3-diisopentylthiourea, 1,3-diphenylthiourea, 1,1,3-trimethylthiourea, ethylene thiourea (2-mercaptoimidazole), and blends thereof.

6. The article of claim 1, wherein the thiourea is selected from butylthiourea, isobutylthiourea, tert-butylthiourea, 1,3-d ibutylthiourea, 1,3-d-tert-butylthiourea, 1,3-diisobutylthiourea, and mixtures thereof.

7. The article of claim 1, further comprising from 5 to 50 phr of butadiene-acrylonitrile-styrene rubber.

8. The article of claim 1, wherein the DIN Abrasion Index is greater than 130.

9. The article of claim 1, wherein the DIN Abrasion Index is greater than 190.

10. The article of claim 1, wherein the Tangent Delta at −30° C. is from greater than 0.400.

11. The article of claim 1, wherein the Tangent Delta at 0° C. is from greater than 0.300.

12. The article of claim 1, wherein the filler is carbon black.

13. The article of claim 1, wherein the filler is silica.

14. The article of claim 1, wherein the filler is a blend of silica and carbon black.

15. The article of claim 13 or 14, also including a crosslinking agent.

16. An abrasion resistant article suitable for an air barrier comprising a composition of from: (a) 10 to 100 phr of a terpolymer of $C_4$ to $C_7$ isoolefin derived units, p-alkylstyrene derived units and p-bromomethylstyrene derived units; (b) from 5 to 80 phr of at least one elastomer selected from natural rubbers, polyisoprene rubber, styrene-butadiene rubber, polybutadiene rubber, isoprene-butadiene rubber, styrene-isoprene-butadiene rubber, butyl rubber, halogenated butyl rubber, butadiene-acrylonitrile-styrene rubber, and mixtures thereof; (c) carbon black; and from (d) 0.1 to 3 phr of at least one thiourea represented by:

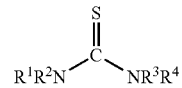

wherein $R^1$, $R^2$, $R^3$, and $R^4$ can be the same or different, and are radicals selected from hydrogen, methyl, ethyl, linear $C_3$ to $C_{20}$ alkyl, branched $C_3$ to $C_{20}$ alkyl, vinyl, linear $C_3$ to $C_{20}$ alkenyl, branched $C_3$ to $C_{20}$ alkenyl, substituted linear $C_3$ to $C_{20}$ alkyl, and substituted branched $C_3$ to $C_{20}$ alkyl; wherein the cured composition has a Tangent Delta at −30° C. and 0° C. of greater than 0.200 and a DIN Abrasion Index of greater than 100.

17. The article of claim 16, wherein the composition also includes from 0.1 to 10 phr of at least one of a peroxide, sulfur, a metal oxide, or a combination thereof.

18. The article of claim 16, wherein the thiourea is present from 0.2 to 1.5 phr.

19. The article of claim 16, wherein the at least one thiourea is selected from the group of structures represented by:

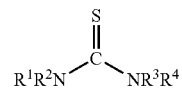

wherein $R^1$, $R^2$, $R^3$, and $R^4$ can be the same or different, and are radicals selected from hydrogen, methyl, ethyl, linear $C_3$ to $C_{20}$ alkyl, branched 03 to 020 alkyl, vinyl, linear $C_3$ to $C_{20}$ alkenyl, and branched $C_3$ to $C_{20}$ alkenyl.

20. The article of claim 16, wherein the at least one thiourea is selected from $H_4$-thiourea, methylthiourea, ethylthiourea, propylthiourea, isopropythiourea, butylthiourea, isobutylthiourea, tert-butylthiourea, 1,3-dimethylthiourea, 1,3-diethylthiourea, 1,3-dipropylthiourea, 1,3-dibutylthiourea, 1,3-di-tert-butylthiourea, 1,3-diisobutylthiourea, 1,3-diisopropylthiourea, 1,3-dipentylthiourea, 1,3-diisopentylthiourea, 1,3-diphenylthiourea, 1,1,3-trimethylthiourea, ethylene thiourea (2-mercaptoimidazole), and blends thereof.

21. The article of claim 16, wherein the thiourea is selected from butylthiourea, isobutylthiourea, tert-butylthiourea, 1,3-dibutylthiourea, 1,3-di-tert-butylthiourea, 1,3-diisobutylthiourea, and mixtures thereof.

22. The article of claim 16, wherein the DIN Abrasion Index is greater than 130.

23. The article of claim 16, wherein the DIN Abrasion Index is greater than 190.

* * * * *